US012784732B2

(12) United States Patent
Khalfan et al.

(10) Patent No.: US 12,784,732 B2
(45) Date of Patent: Nov. 3, 2026

(54) ARTIFICIAL INTELLIGENCE BASED CHARACTER-SPECIFIC SPEECH GENERATION

(71) Applicant: Disney Enterprises, Inc., Burbank, CA (US)

(72) Inventors: Alif Khalfan, Redwood City, CA (US); Malcolm E. Murdock, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 171 days.

(21) Appl. No.: 18/669,410

(22) Filed: May 20, 2024

(65) Prior Publication Data

US 2025/0356839 A1 Nov. 20, 2025

(51) Int. Cl.

| | |
|---|---|
| ***G10L 13/047*** | (2013.01) |
| ***G10L 13/027*** | (2013.01) |
| ***G10L 15/18*** | (2013.01) |
| ***G10L 15/183*** | (2013.01) |

(52) U.S. Cl.
CPC .......... *G10L 13/047* (2013.01); *G10L 13/027* (2013.01); *G10L 15/18* (2013.01); *G10L 15/183* (2013.01)

(58) Field of Classification Search
None
See application file for complete search history.

(56) References Cited

U.S. PATENT DOCUMENTS

| | | | | |
|---|---|---|---|---|
| 8,371,893 | B2 | 2/2013 | Eck et al. | |
| 8,517,788 | B2 | 8/2013 | Eck et al. | |
| 9,272,228 | B2 | 3/2016 | Eck et al. | |
| 9,704,103 | B2 * | 7/2017 | Suskind | G10L 13/08 |
| 2016/0001193 | A1 * | 1/2016 | Eck | A63J 7/005 446/26 |
| 2018/0147728 | A1 * | 5/2018 | Vyas | G06F 3/013 |
| 2020/0279553 | A1 * | 9/2020 | McDuff | G10L 25/78 |

(Continued)

OTHER PUBLICATIONS

Szekely et al., "WinkTalk: a demonstration of a multimodal speech synthesis platform linking facial expressions to expressive synthetic voices" (Year: 2012).*

*Primary Examiner* — Paras D Shah
*Assistant Examiner* — Jacob B Vogt
(74) *Attorney, Agent, or Firm* — Farjami & Farjami LLP

(57) ABSTRACT

A system includes a hardware processor and a memory storing software code, a character database, a language model and an artificial intelligence (AI) model trained to emulate speech by a character. The software code is executed to receive interaction data including a description of speech by a human to a performer impersonating the character and a description of a facial expression by the performer in response, obtain, from the character database, one or more communication trait(s) of the character, and generate, by the language model using the description of the speech and the communication trait(s) as inputs, a character-specific response to the speech. The software code is further executed to synthesize, by the AI model using the character-specific response and the description of the facial expression as inputs, audio data of the character-specific response in a voice of the character, and output the audio data for use by the performer.

19 Claims, 4 Drawing Sheets

(56) References Cited

U.S. PATENT DOCUMENTS

| | | | | |
|---|---|---|---|---|
| 2021/0151029 | A1* | 5/2021 | Gururani | G06N 3/0455 |
| 2022/0129627 | A1* | 4/2022 | Tiwari | G06V 40/20 |
| 2023/0145369 | A1* | 5/2023 | McIntyre-Kirwin | G06F 3/011<br>345/473 |
| 2023/0401794 | A1* | 12/2023 | Chiu | G06T 13/40 |
| 2024/0221260 | A1* | 7/2024 | Dinev | G06T 13/40 |

* cited by examiner

ARTIFICIAL INTELLIGENCE BASED CHARACTER-SPECIFIC SPEECH GENERATION

BACKGROUND

Performers impersonating famous characters, such as well-known cartoon characters associated with distinctive voices and/or distinctive communication traits for example, may be precluded from speaking using their own voices while performing to avoid inconsistency, incongruity and brand dilution. As a result, a performer impersonating a famous character may be limited to using poses, gestures and physical antics to essentially mime communication in response to a human attempting to interact with the character. Although in some cases that performance may be accompanied by pre-recorded speech by the character in a brand-approved voice and using brand-approved language, the resulting interaction would typically be perceived by the human as lacking spontaneity and immersiveness due to the absence of genuine dialogue. Consequently, there is a need in the art for an automated solution for dynamically generating character-specific speech that is responsive to the emotions and language of a human attempting to engage in dialogue with the character.

DETAILED DESCRIPTION

Figure 1:
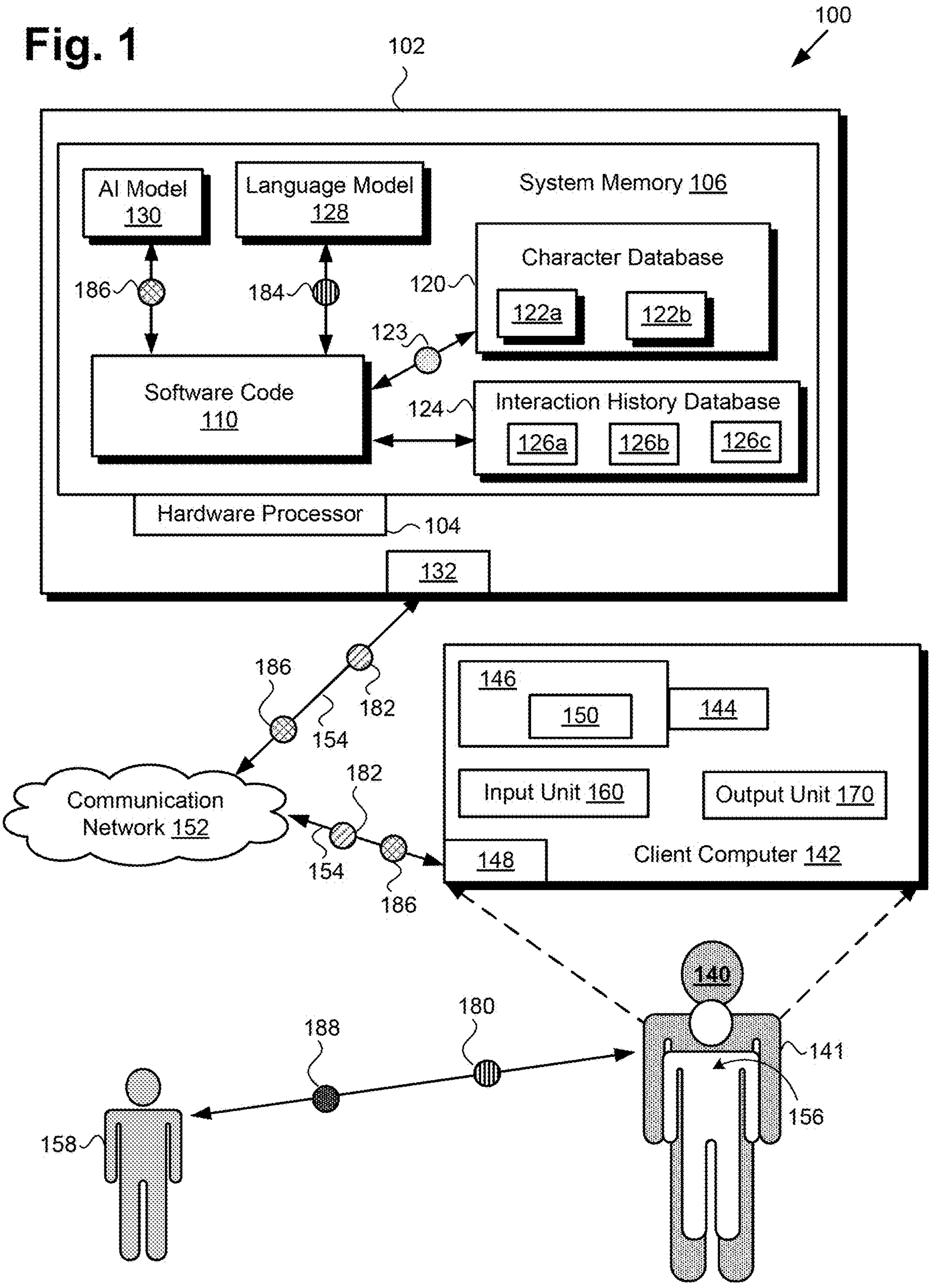
FIG. 1 shows an exemplary system for performing artificial intelligence based (AI-based) character-specific speech generation, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing artificial intelligence based (hereinafter "AI-based") character-specific speech generation that address and overcome the deficiencies in the conventional art. The solution disclosed in the present application advances the state-of-the-art by enabling the dynamic generation of character-specific speech for a character, in the voice and using communication traits of the character, such as the prosody and pronunciation used by the character, in real-time with respect to an interaction with a human. Moreover, the present solution for performing AI-based character-specific speech generation may advantageously be implemented as automated systems and methods.

As used in the present application, the terms "automation," "automated" and "automating" refer to systems and processes that do not require the participation of a human system operator. Although in some implementations the character-specific responses generated by the systems and methods disclosed herein may be reviewed or even modified by a human editor or system operator, that human involvement is optional. Thus, the methods described in the present application may be performed under the control of hardware processing components of the disclosed systems.

In addition, as defined in the present application, the expression "character" refers to the appearance and persona of a cartoon animation, a video game avatar, a fictional human depicted in literature, film, or television, a fictional non-human entity other than a cartoon animation, or a historical personage. A character exhibits behavior and speaks in a manner that can be perceived by a human whom interacts with the character as a unique individual with its own personality. Characters may speak with their own distinctive voice (e.g., phonation, pitch, loudness, rate, dialect, accent, rhythm, inflection and the like) such that a human observer recognizes the character as a unique individual.

It is noted that, as defined in the present application, the expression "real-time" refers to a time interval that enables an interaction, such as a dialogue for example, to occur without an unnatural seeming delay between a statement or question by a human speaker and a responsive expression by a character. It is also noted that, as used herein, the term "prosody" has its conventional meaning and refers to the stress, rhythm, and intonation of spoken language.

FIG. 1 shows exemplary system 100 for performing AI-based character-specific speech generation, according to one implementation. As shown in FIG. 1, system 100 includes computing platform 102 having hardware processor 104, system memory 106 implemented as a non-transitory storage medium, and transceiver 132. According to the present exemplary implementation, system memory 106 stores software code 110, character database 120 including participant character profiles 122*a* and 122*b*, optional interaction history database 124 including interaction histories 126*a*, 126*b* and 126*c*, language model 128, which may be or include a machine learning (ML) model in the form of a Large Language Model (LLM) for example, and AI model 130, which may be an ML model in the form of a generative AI model including a multimodal foundation model for example.

It is noted that, as defined in the present application, the expressions "ML model" and "AI model" refer to a computational models for making predictions based on patterns learned from samples of data or "training data." Various learning algorithms can be used to map correlations between input data and output data. These correlations form the computational model that can be used to make future predictions on new input data. Such predictive models may include logistic regression models, Bayesian models, or artificial neural networks (NNs), LLMs, multimodal foundation models, as well as various classical AI models, to name a few examples.

As further shown in FIG. 1, system 100 is implemented within a use environment including human performer 156 (hereinafter "performer 156") impersonating character 140 and interacting with human 158 (hereinafter "human speaker 158"), who may be engaging in dialogue with character 140 impersonated by performer 156. In addition, FIG. 1 shows performance accessory 141 in the form of a costume or mask (hereinafter "costume or mask 141") including client computer 142 having client hardware processor 144, memory 146 storing client software code 150, transceiver 148, input unit 160 and output unit 170. Also shown in FIG. 1 are communication network 152 providing network communication links 154 communicatively coupling costume or mask 141 to system 100, as well as speech 180 by human speaker 158, interaction data 182 describing speech 180 and a facial expression by performer 156 in response to speech 180, one or more communication traits 123 (hereinafter "communication trait(s) 123") of character 140, character-specific response 184 to speech 180, audio data 186 of character-specific response 184 in the voice of character 140, and audio output 188 of character-specific response 184 in the voice of character 140.

It is noted that although FIG. 1 depicts performer 156 as wearing costume or mask 141, that representation is provided merely by way of example. In other implementations, performer 156 may not wear or otherwise utilize costume or mask 141. In those latter implementations, client computer 142 or simply one or more of transceiver 148, input unit 160 and output unit 170 may be worn by performer 156 independently of costume or mask 141.

Furthermore, although FIG. 1 depicts one human speaker 158 and one character 140, that representation is also merely exemplary. In other implementations, one character, two characters, or more than two characters may engage in an interaction with one or more humans corresponding to human speaker 158. It is also noted that although FIG. 1 depicts two character profiles 122*a* and 122*b*, and three interaction histories 126*a*, 126*b* and 126*c*, character database 120 will typically store tens, hundreds, or thousands of character profiles, while optional interaction history database 124 may store hundreds, thousands, or millions of interaction histories.

Moreover, it is noted that each of interaction histories 126*a*, 126*b* and 126*c* may be an interaction history dedicated to cumulative interactions of character 140 with the same human speaker, or to one or more distinct temporal sessions over which an interaction of one or more characters and a human speaker extends. Furthermore, while in some implementations an interaction history stored in optional interaction history database 124 may be comprehensive with respect to interactions by a human speaker with a particular character or characters, in other implementations, an interaction history stored in optional interaction history database 124 may retain only a predetermined number of the most recent interactions by a human speaker with a character.

It is also noted that the data describing previous interactions between human speaker 158 and character 140 and retained in interaction history database 124 is preferably exclusive of personally identifiable information (PII) of human speaker 158. Thus, interaction history database 124 does not require the retention of information describing the age, gender, race, ethnicity, or any other PII of any human speaker with whom a character has conversed or otherwise interacted.

Although the present application refers to software code 110, character database 120, optional interaction history database 124, language model 128 and AI model 130 as being stored in system memory 106, and to client software code 150 as being stored in memory 146, for conceptual clarity, more generally, system memory 106 and memory 146 may each take the form of any computer-readable non-transitory storage medium. The expression "computer-readable non-transitory storage medium," as defined in the present application, refers to any medium, excluding a carrier wave or other transitory signal that provides instructions to hardware processor 104 of computing platform 102 or to client hardware processor 144 of client computer 142. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

Moreover, in some implementations, system 100 may utilize a decentralized secure digital ledger in addition to system memory 106. Examples of such decentralized secure digital ledgers may include a blockchain, hashgraph, directed acyclic graph (DAG), and Holochain® ledger, to name a few. In use cases in which the decentralized secure digital ledger is a blockchain ledger, it may be advantageous or desirable for the decentralized secure digital ledger to utilize a consensus mechanism having a proof-of-stake (PoS) protocol, rather than the more energy intensive proof-of-work (PoW) protocol.

It is further noted that although FIG. 1 depicts software code 110, character database 120, optional interaction history database 124, language model 128 and AI model 130 as being co-located in system memory 106, that representation is also merely provided as an aid to conceptual clarity. More generally, system 100 may include one or more computing platforms 102, such as computer servers for example, which may be co-located, or may form an interactively linked but distributed system, such as a cloud-based system, for instance. As a result, hardware processor 104 and system memory 106 may correspond to distributed processor and memory resources within system 100. Consequently, in some implementations, software code 110, character database 120, optional interaction history database 124, language model 128 and AI model 130 may be stored remotely from one another on the distributed memory resources of system 100.

In some implementations, costume or mask 141 having client computer 142 may be included as a component of system 100. Furthermore, although FIG. 1 depicts costume or mask 141 as including client computer 142, in some implementations computing platform 102 of system 100 may be integrated with costume or mask 141 and may incorporate input unit 160 and output unit 170, thereby eliminating any need for client computer 142 including client hardware processor 144, memory 146 storing client system software code 150 and transceiver 148.

Hardware processor 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for AI applications such as machine learning modeling.

In some implementations, computing platform 102 may correspond to one or more web servers, accessible over a packet-switched network such as the Internet, for example.

Alternatively, computing platform 102 may correspond to one or more computer servers supporting a private wide area network (WAN), local area network (LAN), or included in another type of limited distribution or private network. In addition, or alternatively, in some implementations, system 100 may utilize a local area broadcast method, such as User Datagram Protocol (UDP) or Bluetooth®, for instance. Furthermore, in some implementations, system 100 may be implemented virtually, such as in a data center. For example, in some implementations, system 100 may be implemented in software, or as virtual machines. Moreover, in some implementations, communication network 152 may be a high-speed network suitable for high performance computing (HPC), for example a 10 GigE network or an Infiniband network.

Client hardware processor 144 may include a plurality of hardware processing units, such as one or more CPUs, one or more GPUs, one or more TPUs, and one or more FPGAs, as those features are defined above.

Transceiver 132, as well as transceiver 148 when present, may be implemented as a wireless communication unit configured for use with one or more of a variety of wireless communication protocols. For example, transceiver 132, or transceivers 132 and 148, may each include a fourth generation (4G) wireless transceiver and/or a 5G wireless transceiver. In addition, or alternatively, transceiver 132, or transceivers 132 and 148, may each be configured for communications using one or more of Wireless Fidelity (Wi-Fi®), Worldwide Interoperability for Microwave Access (WiMAX®), Bluetooth®, Bluetooth® low energy (BLE), ZigBee®, radio-frequency identification (RFID), near-field communication (NFC), and 60 GHz wireless communications methods.

Figure 2:
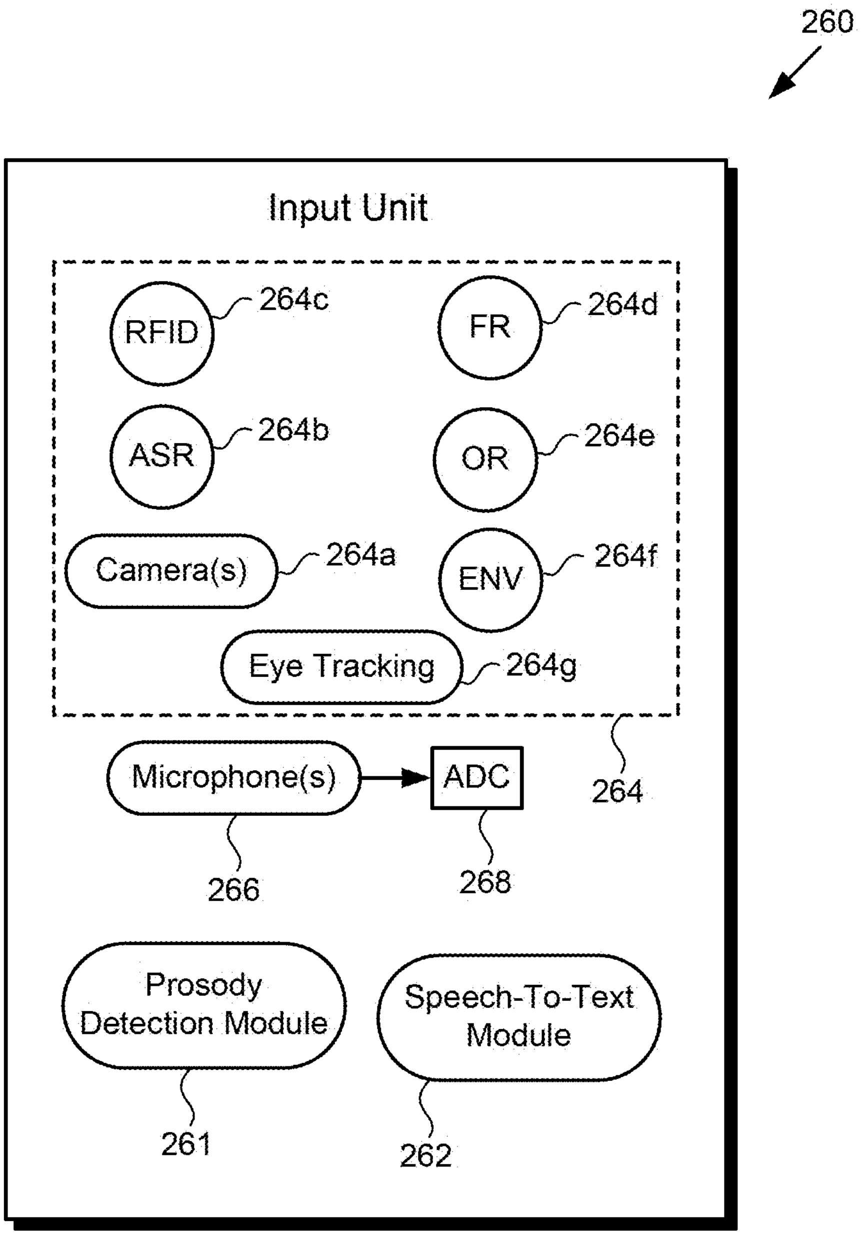
FIG. 2 shows a more detailed diagram of an input unit suitable for use as a component of the system shown in FIG. 1, according to one implementation.

FIG. 2 shows a more detailed diagram of input unit 260 suitable for use as a component of system 100 or client computer 142, in FIG. 1, according to one implementation. As shown in FIG. 2, input unit 260 may include prosody detection module 261 configured to detect the prosody of speech 180 by the human speaker 158, in FIG. 1, speech-to-text (STT) module 262, multiple sensors 264, one or more microphones 266 (hereinafter "microphone(s) 266") and analog-to-digital converter (ADC) 268. As further shown in FIG. 2, sensors 264 of input unit 260 may include one or more cameras **264*a* (hereinafter "camera(s) 264*a*"), automatic speech recognition (ASR) sensor 264*b*, radio-frequency identification (RFID) sensor 264*c*, facial recognition (FR) sensor 264*d*, object recognition (OR) sensor 264*e*, one or more environmental sensors 264*f* (hereinafter "environmental sensor(s) 264*f*") configured to sense the environment of human speaker 158, and eye tracking sensor 264*g* configured to track eye movement by performer 156. Input unit 260 corresponds in general to input unit 160, in FIG. 1. Thus, input unit 160 may share any of the characteristics attributed to input unit 260** by the present disclosure, and vice versa.

It is noted that the specific sensors shown to be included among sensors 264 of input unit 160/260 are merely exemplary, and in other implementations, sensors 264 of input unit 160/260 may include more, or fewer, sensors than camera(s) **264*a*, ASR sensor 264*b*, RFID sensor 264*c*, FR sensor 264*d*, OR sensor 264*e*, environmental sensor(s) 264*f* and eye tracking sensor 264*g*. Moreover, in some implementations, sensors 264 may include a sensor or sensors other than one or more of camera(s) 264*a*, ASR sensor 264*b*, RFID sensor 264*c*, FR sensor 264*d*, OR sensor 264*e*, environmental sensor(s) 264*f* and eye tracking sensor 264*g*. It is further noted that, when included among sensors 264 of input unit 160/260, camera(s) 264*a*** may include various types of cameras, such as outward facing and/or inward facing red-green-blue (RGB) still image and video cameras, RGB-D cameras including a depth sensor, and infrared (IR) cameras, for example.

Figure 3:
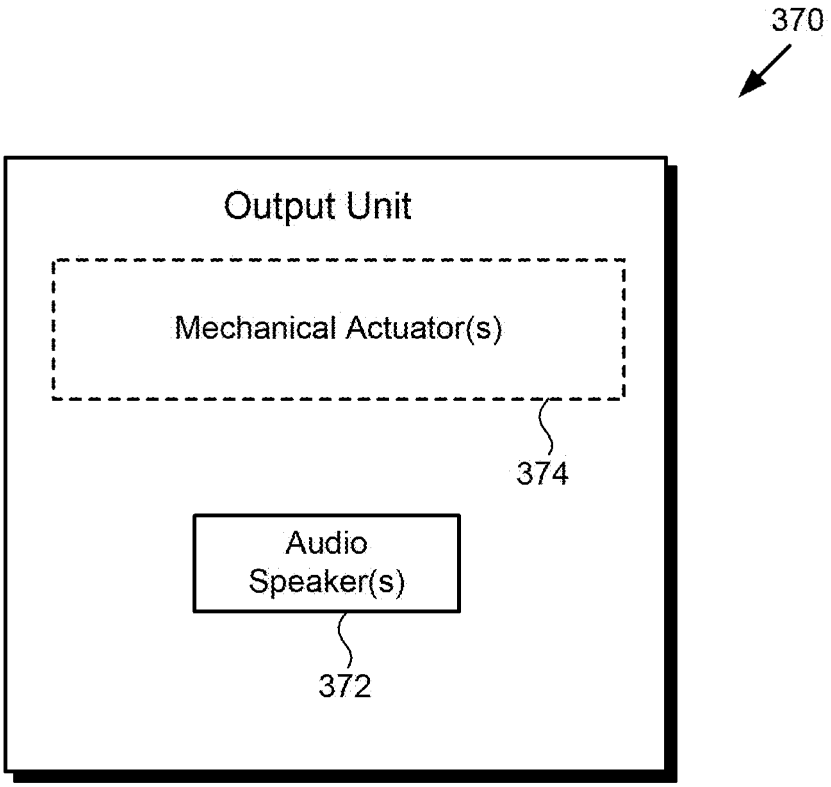
FIG. 3 shows a more detailed diagram of an output unit suitable for use as a component of the system shown in FIG. 1, according to one implementation.

FIG. 3 shows a more detailed diagram of output unit 370 suitable for use as a component of system 100 or client computer 142, in FIG. 1, according to one implementation. As shown in FIG. 3, output unit 370 may include one or more audio speakers 372 (hereinafter "audio speaker(s) 372"). As further shown in FIG. 3, in some implementations, output unit 370 may include one or more mechanical actuators 374 (hereinafter "mechanical actuator(s) 374"). It is further noted that, when included as a component or components of output unit 370, mechanical actuator(s) 374 may be used to produce facial expressions by costume or mask 141. Output unit 370 corresponds in general to output unit 170, in FIG. 1. Thus, output unit 170 and display may share any of the characteristics attributed to output unit 370 by the present disclosure, and vice versa.

It is noted that the specific features shown to be included in output unit 170/370 are merely exemplary, and in other implementations, output unit 170/370 may include more, or fewer, features than audio speaker(s) 372 and mechanical actuator(s) 374. Moreover, in other implementations, output unit 170/370 may include a feature or features other than one or more of audio speaker(s) 372 and mechanical actuator(s) 374.

Figure 4:
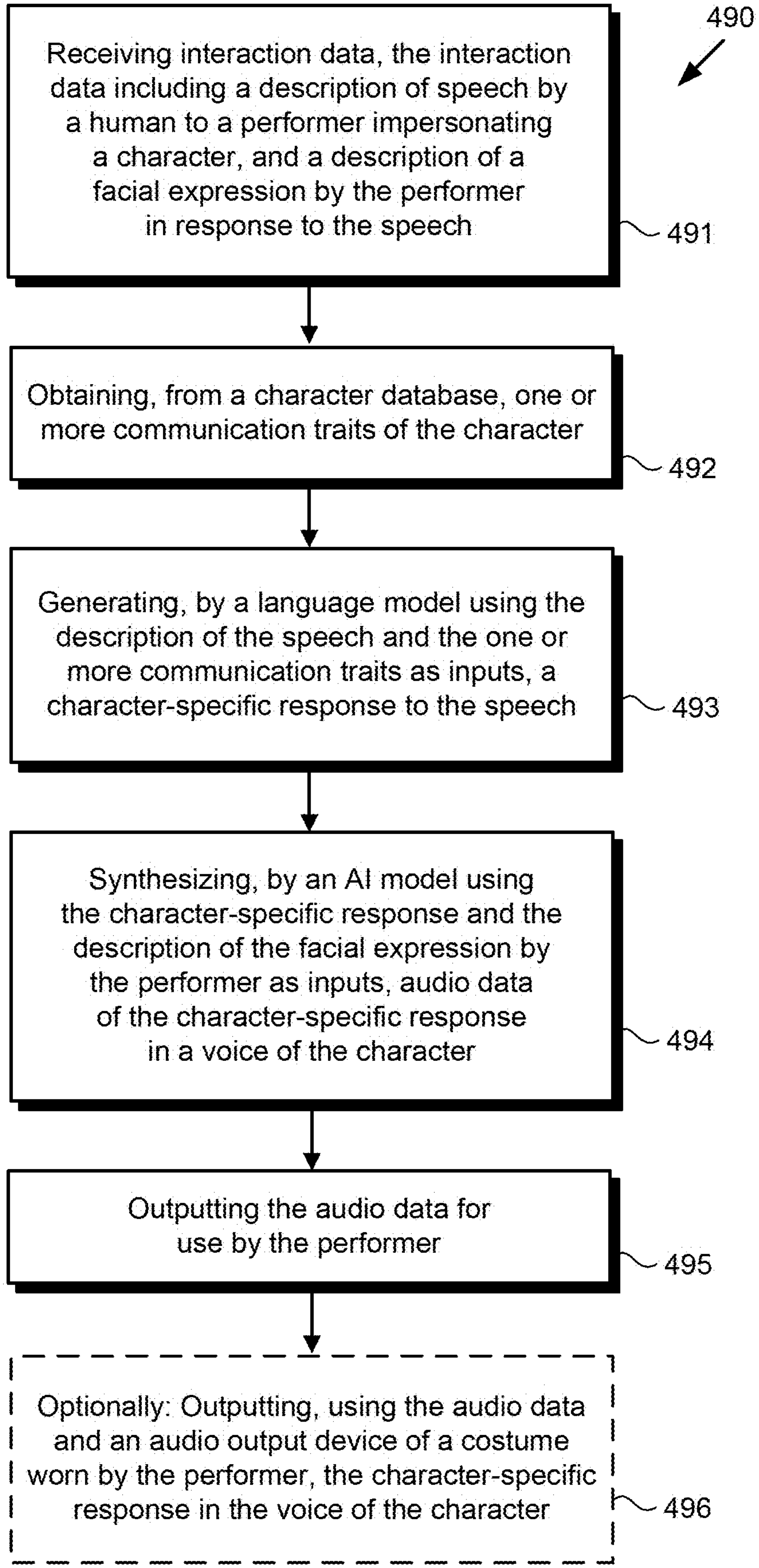
FIG. 4 shows a flowchart presenting an exemplary method for use by a system to perform AI-based character-specific speech generation, according to one implementation.

The functionality of system 100 will be further described by reference to FIG. 4. FIG. 4 shows flowchart 490 presenting an exemplary method for use by a system for performing AI-based character-specific speech generation, according to one implementation. With respect to the method outlined in FIG. 4, it is noted that certain details and features have been left out of flowchart 490 in order not to obscure the discussion of the inventive features in the present application.

Referring to FIG. 4, with further reference to FIGS. 1 and 2, flowchart 490 includes receiving interaction data 182, interaction data 182 including a description of speech 180 by human speaker 158 to performer 156 impersonating character 140, and a description of a facial expression by performer 156 in response to speech 180 (action 491). Interaction data 182 may be produced by input unit 160/260 using any combination of prosody detection module 261, STT module 262, sensors 264, microphone(s) 266 and ADC 268. For example, microphone(s) 266 may capture speech 180, while prosody detection module 261, STT module 262 and ADC 268 may process speech 180. In addition, an inward facing camera, such as a "selfie" type camera or a camera used in "selfie" mode and included among camera(s) **264*a*, may be used to detect a facial expression of performer 156. In addition to speech 180 by human speaker 158 and a responsive facial expression by performer 156, interaction data 182 may further describe ambient sounds, such as background conversations, mechanical sounds, music, announcements, the day of the week and time of day at which speech 180 is uttered, weather conditions, and the occurrence of scheduled events in the vicinity of performer 156**, to name a few examples.

As noted above, in some use cases, performer 156 may not wear or utilize costume or mask 141 and may wear transceiver 148 and input unit 160/260 on their person. In those use cases, interaction data 182 may be received, in action 491, by software code 110, executed by hardware processor 104 of system 100, and using transceiver 132, from transceiver 148 worn by performer 156, via communication network 152 and network communication links 154.

Alternatively, in some implementations, performer 156 may wear costume or mask 141 including client computer 142, which may be included as a component of system 100. In those use cases, interaction data 182 may be received, in action 491, by software code 110, executed by hardware processor 104 of system 100, and using transceiver 132, from transceiver 148 of costume or mask 141, via communication network 152 and network communication links 154. In yet other implementations, computing platform 102 may include input unit 160/260, and may be integrated with costume or mask 141 worn by performer 156. In those implementations, interaction data 182 may be received, in action 491, as a data transfer of interaction data 182 from input unit 160/260 to software code 110 under the control of hardware processor 104 of system 100.

Referring to FIGS. 1 and 4 in combination, flowchart 490 further includes obtaining, from character database 120, communication trait(s) 123 of character 140 (action 492). Communication trait(s) 123 may include a character archetype of character 140, a persona of character 140, the typical prosody of character 140, a distinctive vocabulary used by character 140, or any unusual or idiosyncratic expressions favored by character 140, to name a few examples. Communication trait(s) 123 may be included in a character profile of character 140, such as one of character profiles **122*a* or 122*b* stored in character database 120. Communication trait(s) 123 of character 140 may be obtained, in action 492, by software code 110, executed by hardware processor 104 of system 100**.

It is noted that, as defined in the present application, the expression "character archetype" refers to a template or other representative model providing an exemplar for a particular personality type. That is to say, a character archetype may be affirmatively associated with some personality traits while being dissociated from others. By way of example, the character archetypes "hero" and "villain" may each be associated with substantially opposite traits. While the heroic character archetype may be valiant, steadfast, and honest, the villainous character archetype may be unprincipled, faithless, and greedy. As another example, the character archetype "sidekick" may be characterized by loyalty, deference, and perhaps irreverence. It is further noted that, as defined in the present application, the expression "persona" refers to the emotional and psychological traits associated with the character, such as optimism or pessimism, self-confidence or its lack, and assertiveness or passivity of the character, to name a few examples.

Continuing to refer to FIGS. 1 and 4 in combination, flowchart 490 further includes generating, by language model 128 using the description of speech 180 included in interaction data 182 and communication trait(s) 123 as inputs, character-specific response 184 to speech 180 (action 493). As noted above, in some implementations, language model 128 may be an LLM. Moreover, language model 128 may be purposefully trained on character 140 to generate language that is distinctly identifiable as being specific to character 140. Language model 128 may be trained using reinforcement learning, for example, to generate character-specific response 184 as text. Character-specific response 184 may be generated, in action 493, by language model 128, utilized by software code 110 executed by hardware processor 104 of system 100.

As shown in FIG. 1, in some implementations system 100 may include optional interaction history database 124 including an interaction history of human speaker 158 with character 140. In those implementations, hardware processor 104 of system 100 may further execute software code 110 to obtain the interaction history of human speaker 158 with character 140 from interaction history database 124 and include the interaction history of human speaker 158 with character 140 as an additional input to language model 128 when using language model 128 to generate character-specific response 184 to speech 180 by human speaker 158 in action 493.

Continuing to refer to FIGS. 1 and 4 in combination, flowchart 490 further includes synthesizing, by AI model 130 using character-specific response 184 and the description of the facial expression by performer 156 included in interaction data 182 as inputs, audio data 186 of character-specific response 184 in the voice of character 140 (action 494). As noted above, in some implementations, AI model 130 may be a generative AI model and may include a multi-modal foundation model. Moreover, AI model 130 may be purposefully trained on character 140 to generate audio data 186 of speech that is distinctly identifiable as being specific to character 140.

It is noted that the facial expression by performer 156 included in interaction data 182 may be used to identify a desired emotional tone of the character-specific speech in the voice of character 140, in action 494. For example, where the facial expression by performer 156 in response to speech 180 is a smile, the emotion conveyed by character-specific speech 184 in the voice of character 140 may be happiness. By contrast, where the facial expression by performer 156 in response to speech 180 is a smirk or a frown, the emotion conveyed by character-specific speech 184 in the voice of character 140 may be smugness or disappointment, respectively. Audio data 186 may be synthesized, in action 494, by AI model 130, utilized by software code 110 executed by hardware processor 104 of system 100.

Referring to FIGS. 1, 3 and 4 in combination, flowchart 490 further includes outputting audio data 186 for use by performer 156 (action 495). As noted above, in some use cases, performer 156 may not wear or utilize costume or mask 141 and may wear transceiver 148 on their person. In those use cases, audio data 186 may be output, in action 495, by software code 110, executed by hardware processor 104 of system 100, and using transceiver 132, to transceiver 148 worn by performer 156, via communication network 152 and network communication links 154. Alternatively, in some implementations, performer 156 may wear costume or mask 141 including client computer 142, which may be included as a component of system 100. In those use cases, audio data 186 may be output, in action 495, by software code 110, executed by hardware processor 104 of system 100, and using transceiver 132, to transceiver 148 of costume or mask 141, via communication network 152 and network communication links 154. In yet other implementations, computing platform 102 may include output unit 170/370, and may be integrated with costume or mask 141 worn by performer 156. In those implementations, audio data 186 may be output, in action 495, as a data transfer of audio data 186 from software code 110, under the control of hardware processor 104 of system 100, to output unit 170/370.

In some implementations, the method outlined by flowchart 490 may conclude with action 495 described above. However, and continuing to refer to FIGS. 1, 3 and 4 in combination, in other implementations flowchart 490 may further include optionally outputting, using audio data 186 and an audio output device of output unit 170/370, such as audio speaker(s) 372 for example, character-specific response 184 as audio output 188 of character-specific response 184 in the voice of character 140 (action 496). As noted above, in some implementations, performer 156 may wear costume or mask 141 including client computer 142, which may be included as a component of system 100. In those implementations, audio output 188 of character-specific response 184 in the voice of character 140 may be output, in action 496, by client software code 150, executed by hardware processor 144 of client computer 142, using output unit 170/370. In other implementations, computing platform 102 may include output unit 170/370, and may be integrated with costume or mask 141 worn by performer 156. In those implementations, audio output 188 of character-specific response 184 in the voice of character 140 may be output, in action 496, by software code 110, executed by hardware processor 104 of system 100, using output unit 170/370.

With respect to the method outlined by flowchart 490, it is noted that actions 491, 492, 493, 494 and 495, or actions 491, 492, 493, 494, 495, and optional action 496, may be performed as an automated process from which human participation other than the interaction by human speaker 158 with performer 156, in FIG. 1, may be omitted.

Thus, the present application discloses systems and methods for performing AI-based character-specific speech generation that address and overcome the deficiencies in the conventional art. The solution disclosed in the present application advances the state-of-the-art by enabling the dynamic generation of character-specific speech for a character, in the voice and using communication traits of the character, in real-time with respect to an interaction with a human.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:

a computing platform including a hardware processor and a system memory, the system memory storing a software code, a character database, a large language model, and an artificial intelligence (AI) model trained to emulate speech by a character;

wherein the hardware processor is configured to execute the software code to:

receive interaction data including (i) a description of a speech by a first human to a second human who is not the first human, the second human impersonating the character while wearing a performance accessory, and (ii) a description of a facial expression by the second human in response to the speech;

obtain, from the character database, one or more communication traits of the character including a prosody of the character;

generate, by the large language model using the description of the speech and the one or more communication traits as inputs, in real-time with respect to the speech by the first human, a character-specific response to the speech; and synthesize, by the AI model using the character-specific response and the description of the facial expression by the second human as inputs, audio data of the character-specific response in a voice of the character; and the performance accessory configured to: receive the synthesized audio data; and output, using the synthesized audio data and an audio output device of the performance accessory, the character-specific response in the voice of the character.

2. The system of claim 1, wherein the synthesized audio data is received by a transceiver of the performance accessory.

3. The system of claim 1, wherein the interaction data is received from a transceiver of the performance accessory.

4. The system of claim 1, wherein the performance accessory comprises a costume or a mask worn by the second human.

5. The system of claim 1, wherein the performance accessory further comprises a client hardware processor and a client software code, and wherein the client hardware processor is configured to execute the client software code to:

output, using the synthesized audio data and the audio output device, the character-specific response in the voice of the character.

6. The system of claim 1, wherein the computing platform is integrated with the performance accessory, and the hardware processor is configured to execute the software code to:

output, using the synthesized audio data and the audio output device, the character-specific response in the voice of the character.

7. The system of claim 1, wherein the performance accessory further comprises at least one environmental sensor, and the interaction data further includes environmental data from the at least one environmental sensor.

8. The system of claim 1, wherein the performance accessory further comprises a prosody detection module configured to detect a prosody of the speech by the first human, and the interaction data further includes prosody data describing the prosody of the speech by the first human.

9. The system of claim 1, further comprising an interaction history database including an interaction history of the first human with the character, wherein the hardware processor is further configured to execute the software code to:

obtain the interaction history from the interaction history database; and include the interaction history as an additional input to the large language model when using the large language model to generate the character-specific response.

10. The system of claim 1, wherein the AI model is a generative AI model comprising a multi-modal foundation model.

11. The system of claim 1, wherein the performance accessory further comprises an internal camera facing the performer second human.

12. The system of claim 1, wherein the interaction data further comprises a description of a facial expression by the performer second human in response to the speech.

13. The system of claim 1, wherein the performance accessory further comprises an eye tracking device configured to track eye movement of the second human.

14. A method for use by a system including a computing platform and a performance accessory having an audio output device, the computing platform having a hardware processor and a system memory, the system memory storing a software code, a character database, a large language model, and an artificial intelligence (AI) model trained to emulate speech by a character, the method comprising:

receiving, by the software code executed by the hardware processor, interaction data including (i) a description of a speech by a first human to a second human who is not the first human, the second human impersonating the character while wearing the performance accessory, and (ii) a description of a facial expression by the second human in response to the speech;

obtaining from the character database, by the software code executed by the hardware processor, one or more communication traits of the character including a prosody of the character;

generating, by the large language model using the description of the speech and the one or more communication traits as inputs, in real-time with respect to the speech by the first human, a character-specific response to the speech;

synthesizing, by the AI model using the character-specific response and the description of the facial expression by the second human as inputs, audio data of the character-specific response in a voice of the character;

receiving, by the performance accessory, the synthesized audio data; and outputting, by the performance accessory using the synthesized audio data and the audio output device, the character-specific response in the voice of the character.

15. The method of claim 14, wherein the computing platform is integrated with the performance accessory.

16. The method of claim 14, wherein the performance accessory comprises at least one of (i) a plurality of environmental sensors, (ii) a prosody detection module configured to detect a prosody of the speech by the first human, (iii) an inward facing internal camera, or (iv) an eye tracking device configured to track eye movement of the performer second human.

17. The method of claim 14, wherein the interaction data further includes at least one of environmental data describing an environment of the first human or prosody data describing the prosody of the speech by the first human.

18. The method of claim 14, wherein the system memory further stores an interaction history database including an interaction history of the first human with the character, the method further comprising:

obtaining, by the software code executed by the hardware processor, the interaction history from the interaction history database; and including, by the software code executed by the hardware processor, the interaction history as an additional input to the large language model when using the large language model to generate the character-specific response to the speech by the first human.

19. The method of claim 14, wherein the AI model is a generative AI model comprising a multi-modal foundation model.

* * * * *